United States Patent
Aurén et al.

(10) Patent No.: US 9,984,776 B2
(45) Date of Patent: May 29, 2018

(54) FUEL ASSEMBLY FOR A NUCLEAR BOILING WATER REACTOR

(71) Applicant: Westinghouse Electric Sweden AB, Västerås (SE)

(72) Inventors: Jonas Aurén, Västerås (SE); Uffe Bergmann, Västerås (SE)

(73) Assignee: Westinghouse Electric Sweden AB, Västerås (SE)

( * ) Notice: Subject to any disclaimer, the term of this patent is extended or adjusted under 35 U.S.C. 154(b) by 0 days. days.

(21) Appl. No.: 15/552,108

(22) PCT Filed: Feb. 10, 2016

(86) PCT No.: PCT/EP2016/052825
§ 371 (c)(1),
(2) Date: Aug. 18, 2017

(87) PCT Pub. No.: WO2016/131692
PCT Pub. Date: Aug. 25, 2016

(65) Prior Publication Data
US 2018/0096744 A1    Apr. 5, 2018

(30) Foreign Application Priority Data
Feb. 20, 2015 (EP) ..................................... 15155985

(51) Int. Cl.
*G21C 3/328* (2006.01)
*G21C 3/322* (2006.01)

(52) U.S. Cl.
CPC ............. *G21C 3/328* (2013.01); *G21C 3/322* (2013.01); *G21C 2003/3225* (2013.01)

(58) Field of Classification Search
CPC . G21C 3/30; G21C 3/32; G21C 3/322; G21C 3/328; G21C 2003/3225
See application file for complete search history.

(56) References Cited

U.S. PATENT DOCUMENTS 4,876,062 A * 10/1989 Aoyama ................. G21C 3/322
                                                              376/443
4,968,479 A    11/1990 Ogiya et al.
(Continued)

FOREIGN PATENT DOCUMENTS

EP    1551034 A2    7/2005
JP    03108691 A    5/1991

OTHER PUBLICATIONS

PCT Notification Concerning Transmittal of International Preliminary Report on Patentability issued in corresponding application No. PCT/EP2016/052825, dated Aug. 22, 2017, pp. 1-10.
(Continued)

*Primary Examiner* — Sharon M Davis
(74) *Attorney, Agent, or Firm* — Murtha Cullina LLP (57) ABSTRACT

A fuel assembly for a nuclear power boiling water reactor including a fuel channel defining a central fuel channel axis, fuel rods, each having a central fuel rod axis, at least 3 water channels for non-boiling water, each water channel having a central water channel axis and each water channel having a larger cross-sectional area than the cross-sectional area of (the average) fuel rod. The fuel rods include a first group of full length fuel rods and a second group of shorter fuel rods. The fuel assembly comprises 3 or 4 fuel rods which belong to said second group and which are positioned such that the central fuel rod axis of each of these 3 or 4 fuel rods is closer to the central fuel channel axis than any of the water channel axes of the water channels.

14 Claims, 3 Drawing Sheets

(56) References Cited

U.S. PATENT DOCUMENTS 5,068,082 A     11/1991  Ueda et al.
5,192,496 A      3/1993  Soneda et al.
5,432,829 A *    7/1995  Aoyama ................ G21C 3/328
                                                        376/434

OTHER PUBLICATIONS

EP Communication issued in corresponding application No. EP15155985.3, dated Mar. 13, 2017, pp. 1-7.
International Search Report issued in corresponding application No. PCT/EP2016/052825, dated May 2, 2016, pp. 1-2.

* cited by examiner

FUEL ASSEMBLY FOR A NUCLEAR BOILING WATER REACTOR

FIELD

The present invention concerns a fuel assembly for a nuclear power boiling water reactor.

BACKGROUND

In a fuel assembly for a nuclear boiling water reactor, there are a number of fuel rods, which comprise a nuclear fuel material. When the fuel assembly is in operation in a nuclear reactor, a cooling medium, usually water, flows up through the fuel assembly. This water fulfills several functions. It functions as a cooling medium for cooling the fuel rods such that they will not be overheated. The water also serves as a neutron moderator, i.e. the water slows down the neutrons to a lower speed. Thereby, the reactivity of the reactor is increased.

Since the water flows upwards through the fuel assembly, in the upper part of the fuel assembly, the water has been heated to a larger extent. This has as a consequence that the portion of steam is larger in the upper part of the fuel assembly than in the lower part. Since steam has a relatively low density, the steam in the upper part of the fuel assembly is a poorer moderator than the water in the lower part of the fuel assembly. Furthermore, cold water is a better moderator than warm water. This means that the largest moderation is obtained when the reactor is out of operation, i.e. when it is cool. The reactivity of a reactor depends on the amount of nuclear fuel material and on the amount of moderator. The reactivity in a cool reactor is thereby higher than the reactivity in a warm reactor. To enable safe shutdown, there are requirements on a highest allowed reactivity when the reactor is out of operation. An aim is thus that the reactor has a reactivity as high as possible when the reactor is in operation at the same time as the reactivity may not be too high when the reactor is out of operation.

It should be mentioned that the water does not only have a moderating function. The water functions in fact also as a neutron absorber. In this context, the expression over-moderation is often used. Thereby is meant that the absorbing function of the water dominates over its moderating function. Such an over-moderation thus leads to a lowered reactivity. This means that the requirement on a highest allowed reactivity when the reactor is out of operation is more easily fulfilled if the amount of water leads to over-moderation.

Another requirement is that the cooling of the fuel rods is sufficient such that a so-called dry-out does not occur. Dry-out means that the water film which exists on the surface of the fuel rods disappears or is broken in limited areas. This leads to a locally deteriorated heat transfer between the fuel rod and the water flowing through the fuel assembly. This leads in its turn to an increased wall temperature of the fuel rods. The increased wall temperature may lead to serious damage on the fuel rod.

It is desired to achieve a distribution of fission power over the cross-section of the fuel assembly which is more uniform such that the so-called radial peaking factor will be reduced. This means that the assembly can be operated to a higher total power before any individual fuel rod reaches its limits in terms of dry-out margin and other safety related parameters.

In order to fulfill the different safety requirements, to obtain a sufficient cooling of the fuel rods, and, at the same time, to obtain a high reactivity during operation, a large number of different technical solutions have been proposed.

Examples of different designs of fuel assemblies for a nuclear boiling water reactor can be seen in EP 1551034 A2, U.S. Pat. No. 5,068,082 and U.S. Pat. No. 4,968,479.

SUMMARY OF THE INVENTION

An object of the present invention is to provide a fuel assembly for a nuclear boiling water reactor with an improved cold shut-down margin, i.e. the reactivity should be sufficiently low when the nuclear reactor is shut down (cold condition). A further object is to provide such a fuel assembly which has a high reactivity when the nuclear reactor is in operation (hot condition). A further object is to provide such a fuel assembly which has a fission power distributed evenly over the cross-section of the fuel assembly. A further object is to provide such a fuel assembly which has a reduced pressure drop in the upper two-phase flow region, in order to improve thermal-hydraulic stability. Another object is to provide such a fuel assembly in which the risk to cause damage to spacer grids positioned at higher levels in the fuel assembly (above shorter fuel rods) is low. Still another object is to provide such a fuel assembly which has an advantageous nuclear performance.

The above objects are achieved by a fuel assembly as defined in a fuel assembly for a nuclear power boiling water reactor, comprising: a fuel channel extending in and defining a length direction of the fuel assembly and defining a central fuel channel axis extending in said length direction, fuel rods positioned such that they are surrounded by said fuel channel, each fuel rod having a central fuel rod axis extending substantially in said length direction, water channels positioned such that they are surrounded by said fuel channel, the water channels being configured and positioned for, during operation, allowing non-boiling water to flow through the water channels, each water channel having a central water channel axis extending substantially in said length direction, wherein said fuel rods comprise a first group of fuel rods and a second group of fuel rods, wherein each fuel rod in said first group is a so-called full length fuel rod which extends from a lower part of the fuel assembly to an upper part of the fuel assembly, wherein each fuel rod in said second group extends from said lower part of the fuel assembly and upwards, but does not reach as high up as said full length fuel rods, wherein the fuel assembly comprises at least 3 water channels, each of which has a cross-sectional area which is at least twice as large as the cross-sectional area of each one of said fuel rods, or, in case the fuel assembly has fuel rods of different cross-sectional areas, at least twice as large as the average cross-sectional area of the fuel rods, wherein said at least 3 water channels are positioned such that there is no further water channel, the central water channel axis of which is closer to the central fuel channel axis than the central water channel axis of each of said at least 3 water channels, characterized in that the fuel assembly comprises 3 or 4, but not more than 4, fuel rods which belong to said second group and which are positioned such that the central fuel rod axis of each of these 3 or 4 fuel rods is closer to the central fuel channel axis than any of the water channel axes of the water channels.

Since the fuel assembly comprises a relatively large number of shorter fuel rods in a central position of the fuel assembly, together with at least three, relatively large, water channels, which are positioned "outside" of the central short fuel rods, a large volume of water is created in the central upper region of the fuel assembly, when the nuclear reactor is in the cold condition. This region is then overmoderated and the cold reactivity is reduced. Therefore, an improved shut-down margin is obtained. Furthermore, since at least three, relatively large, water channels are used, and since these water channels are "spread out" in the fuel assembly (since they are positioned further out from the central fuel channel axis than the defined 3 or 4 central shorter fuel rods), these water channels will be located near many of the fuel rods arranged in the fuel assembly. Therefore a good moderation is obtained in the hot condition, which means that the reactivity of the nuclear reactor will be high. Moreover, because the reactivity is more evenly spread out to more fuel rods, the distribution of fission power over the cross-section of the fuel assembly will be more uniform. Also, because of the relatively large number of central shorter fuel rods, a larger volume without any fuel rods is created in the upper part of the fuel assembly. This means that the pressure drop will be relatively low in the upper part of the fuel assembly as desired. The fact that there are not more than four short central fuel rods, which fulfill the definition in claim 1, means that the flow velocity of the steam and water in the central opening above these fuel rods will not be very high. A too high flow velocity in this region could increase the corrosion and erosion of the spacer material positioned at higher levels in the fuel assembly. Loss of spacer material by erosion can harm the spacer integrity. This elevated erosion risk can be handled by removing the empty spacer cells above the short central fuel rods. However, this weakens the mechanical strength of the spacer grids in the central region when exposed to external loads, e.g., during transport or in an earthquake event. The present invention allows keeping the empty spacer cells, which increases the structural strength of the spacer grids, while maintaining a low risk of erosion.

Furthermore, by having not more than four central short fuel rods of the kind described above, the nuclear performance is more optimized; for example the so-called void reactivity coefficient is thereby improved to minimize the severity of certain anticipated events, such as pressure transients, and the shut down margin is well optimized, in particular relating to the lower part of the fuel assembly.

In an operating boiling water reactor the moderation changes up through the reactor due to the formation of steam and hence the reduced density. This gives a higher conversion in the upper part, i.e. more production of Pu-239 from U-238, with higher reactivity at cold condition as a result. This problem has in the prior art been solved by use of shorter fuel rods. Since the shorter rods have negative side effects, their numbers, lengths and positions are crucial.

The relatively large open region above the 3 or 4 central shorter fuel rods also enhances natural steam separation which reduces the average steam volume and hence increases moderation at hot conditions. A separation of steam and water where the steam travels upwards through the assembly at a higher speed reduces the average steam volume. This process requires larger open areas than the empty positions above single shorter fuel rods.

The following may be noted concerning the expressions used in the claims.

A fuel channel can also be called for example a box wall or channel wall.

The fuel channel is normally quite long (for example about 4 m) compared to its width (for example about 1.5 dm). It therefore has a length direction.

In use in a nuclear reactor, the fuel assembly, and the fuel channel, preferably extend mainly in the vertical direction. The length direction is thus, in use, the vertical direction.

The lower and upper parts of the fuel assembly therefore refer to the fuel assembly as seen in the intended use position.

The fuel rods could be slightly tilted. Hence, it is specified that the fuel rod axis extends substantially in the length direction. However, preferably the fuel rods are not tilted and therefore the fuel rod axis extends only in the length direction.

Preferably the fuel rods are straight. However, the fuel rods may also be somewhat bent. The defined central fuel rod axis would in that case follow the bent shape of the fuel rod, i.e. also the central fuel rod axis would in that case be bent.

Similarly for the water channels. The water channels could be slightly tilted. Hence it is specified that the water channel axis extends substantially in the length direction. However, preferably the water channels are not tilted and therefore the water channel axis extends only in the length direction. Also, preferably the water channels are straight. However, the water channels could also be bent. The defined central water channel axis would in that case follow the bent shape of the water channel, i.e. also the central water channel axis would in that case be bent.

A water channel in this application thus means an enclosure (for example of a tubular shape) which is positioned in the fuel assembly and which is arranged for allowing non-boiling water to flow therethrough.

Furthermore, preferably the water channel has a constant cross-sectional area over at least 80% of its length, preferably over its whole length (the cross-sectional area could change somewhat close to the end(s) of the water channel). However, according to an alternative embodiment, the cross-sectional area of the water channel may vary along its length. For example, the cross-sectional area may become larger at a level above the mentioned 3 or 4 shorter central fuel rods.

When the cross-sectional area of the water channels and the fuel rods are compared with each other, this comparison concerns the same level in the fuel assembly (in case the water channels or, possibly, the fuel rods would have a varying cross-sectional area). In particular, the comparison applies to the lower part of fuel assembly, where the shorter fuel rods are positioned.

The cross-sectional area relates to the area defined by the outer periphery of the water channels or the fuel rods.

The nuclear reactor is preferably a light water reactor.

According to one embodiment of a fuel assembly according to the invention, there is no full length fuel rod, the central fuel rod axis of which is positioned closer to the central fuel channel axis than the central fuel rod axis of any of said 3 or 4 fuel rods. This fact ensures that there will be a relatively large region above the mentioned centrally located shorter fuel rods. Consequently, a space is provided above these shorter rods for a relatively large volume of water, which will improve the shut-down margin.

According to another embodiment of a fuel assembly according to the invention, the fuel assembly comprises 4 fuel rods which belong to said second group and which are positioned such that the central fuel rod axis of each of these 4 fuel rods is closer to the central fuel channel axis than any of the water channel axes of the water channels. With 4 such fuel rods, a larger central space is created, which means a further improved shut-down margin.

According to another embodiment of a fuel assembly according to the invention, the fuel assembly comprises a set of 6-12, preferably 6-10, fuel rods, wherein said set includes said 3 or 4 fuel rods, wherein each fuel rod in said set has a length which is less than 0.80 times the length of said full length fuel rods, wherein the fuel rods in said set are grouped together such that each fuel rod in said set is positioned next to at least one other fuel rod belonging to said set. According to this embodiment, there are thus a relatively large number of centrally located shorter fuel rods. This ensures a quite large space for water above these fuel rods. This space, together with the space inside the water channels, ensure a good shut-down margin.

According to another embodiment of a fuel assembly according to the invention, each of said 3 or 4 fuel rods has a length that is less than 0.50 times the length of said full length fuel rods. Since the fuel rods are that short, it is ensured that there is a large space for water above the fuel rods.

According to a preferred embodiment, each of said 3 or 4 fuel rods has a length that is between 0.25 and 0.45 times the length of said full length fuel rods. With such short fuel rods an even larger volume for water is created.

According to another embodiment, there is no fuel rod which is such that it is longer than 0.50 times the length of said full length fuel rods and has a central fuel rod axis which is positioned closer to the central fuel channel axis than the central fuel rod axis of any of said 3 or 4 fuel rods. Similarly to the above explanation, by ensuring that there are no longer fuel rods among the mentioned central shorter fuel rods, a large, undisturbed, space for water is created.

According to another embodiment, the fuel assembly comprises no more than 3 of said at least 3 water channels. It has been found that the use of three such, relatively large, water channels is optimal for achieving good moderation in the hot condition, at the same time as there is still sufficient space in the fuel assembly for a relatively large number of fuel rods.

According to a preferred embodiment, the fuel assembly does not comprise any other water channels either (i.e. also no water channel with a cross-sectional area which is less than twice as large as the cross-sectional area of each one of said fuel rods, or, in case the fuel assembly has fuel rods of different cross-sectional areas, less than twice as large as the average cross-sectional area of the fuel rods).

According to another embodiment, each one of said at least 3 water channels has a cross-sectional area which is between 3.0 and 10.0, preferably between 4.0 and 8.0, times the cross-sectional area of each one of said fuel rods, or, in case the fuel assembly has fuel rods of different cross-sectional areas, between 3.0 and 10.0, preferably between 4.0 and 8.0, times the average cross-sectional area of the fuel rods. With such relatively large water channels, a sufficiently high amount of non-boiling water will flow through the fuel assembly. This ensures a good moderation, i.e. a high reactivity.

According to another embodiment, each of said at least 3 water channels has a circular cross-section, at least in the portion of the water channel that is located at the level of said 3 or 4 fuel rods. From a flow dynamic point of view, it is advantageous to use round water channels. Furthermore, it is easy to manufacture and position such round water channels in the fuel assembly.

According to another embodiment, the fuel assembly comprises no more than 12 fuel rods, preferably no more than 8 fuel rods, more preferred no more than 6 fuel rods, each of which fulfills the following criterion: the distance between the central fuel rod axis and the central fuel channel axis is less than the distance between the central water channel axis of at least one of said at least 3 water channels and the central fuel channel axis. It is thereby ensured that the water channels are not positioned too far towards the periphery of the fuel assembly. This means that a good moderation, and a high reactivity, for many fuel rods is achieved, and consequently also an evenly distributed fission power.

According to a preferred embodiment, the fuel assembly comprises 6 fuel rods which fulfill the mentioned criterion. This has appeared to ensure an optimal positioning of the water channels.

This means that the water channels are positioned near the central short fuel rods. Preferably, each of the water channels is positioned next to at least two of said 3 or 4 fuel rods, such that there is no further fuel rod positioned between the respective water channel and said 3 or 4 central short fuel rods.

According to another embodiment, the fuel assembly comprises a substantially regular pattern of fuel rod positions, wherein each one of said at least 3 water channels is positioned such that it replaces 4 fuel rods in this substantially regular pattern. Such a design is quite easy to implement in a fuel assembly.

The concept "substantially regular pattern" is used, since some fuel rods may be slightly displaced from the absolutely regular pattern. Preferably the regular pattern is in the form of rows and columns (when a cross-section of the fuel assembly is viewed).

According to another embodiment, the fuel assembly comprises 65-160, preferably 100-120, more preferred 105-113, most preferred 109 fuel rods. Such a relatively high number of fuel rods ensures that the fuel assembly can achieve an efficient heat transfer to the coolant, and because of the arrangement of the fuel rods and the water channels, a good moderation is obtained.

According to another embodiment, the fuel assembly comprises 2-10, preferably 6-8 fuel rods, each of which has a length of between 0.59 and 0.79 times the length of said full length fuel rods. The arrangement of such fuel rods contributes to the shut-down margin and to a reduction of the pressure drop in the upper part of the fuel assembly.

According to one embodiment, the fuel assembly comprises 8-16, preferably 10-12 fuel rods, each of which has a length that is between 0.25 and 0.45 times the length of said full length fuel rods. With this number of such short fuel rods, the shut-down margin is improved.

According to another embodiment, the fuel assembly comprises at least 70, preferably at least 80, or at least 90 full length fuel rods. An efficient heat transfer is obtained by using many full length fuel rods.

According to one embodiment, the fuel assembly comprises 5-20, preferably 10-15 fuel rods, each of which has a length of between 0.80 and 0.95 times the length of said full length fuel rods. The arrangement of such fuel rods will reduce the pressure drop in the upper part of the fuel assembly, near the outlet for the water/steam.

According to another embodiment, the fuel assembly comprises:

a lower tie plate, positioned below the fuel rods, wherein a lower end of each of said at least 3 water channels is attached to said tie plate, an upper lifting device, positioned above the fuel rods, including a handle for gripping and lifting a bundle of fuel rods, a plurality of spacer grids for holding the fuel rods, at least most of the spacer grids being attached to said at least 3 water channels, attachment rods, attached at a lower end to the upper part of said at least 3 water channels and at an upper end attached to said upper lifting device.

Such a design will make it easier to handle the bundle of fuel rods. Since the upper handle and lifting device is attached to the attachment rods, which are attached to the water channels, which are attached to the lower tie plate, and since the spacer grids hold the fuel rods and since at least most of the spacer grids are attached to the water channels, it is possible to lift the whole bundle of fuel rods by gripping and lifting the handle.

According to one design principle, the fuel channel is permanently fixed to a bottom transition piece, which includes a debris filter, and the whole fuel bundle as described above (including upper handle and lifting device, attachments rods, water channels, lower tie plate, and spacer grids) is lowered into the fuel channel and is resting freely on top of the transition piece.

According to an alternative design principle, the whole fuel bundle as described above (including upper handle and lifting device, attachments rods, water channels, lower tie plate, and spacer grids) is permanently fixed to the transition piece, which includes a debris filter, and the fuel channel is placed over the fuel bundle and resting on the upper lifting device or handle.

DESCRIPTION OF EMBODIMENTS OF THE INVENTION

A first embodiment of the invention will now be described with reference to FIG. 1 and FIG. 2.

Figure 1:
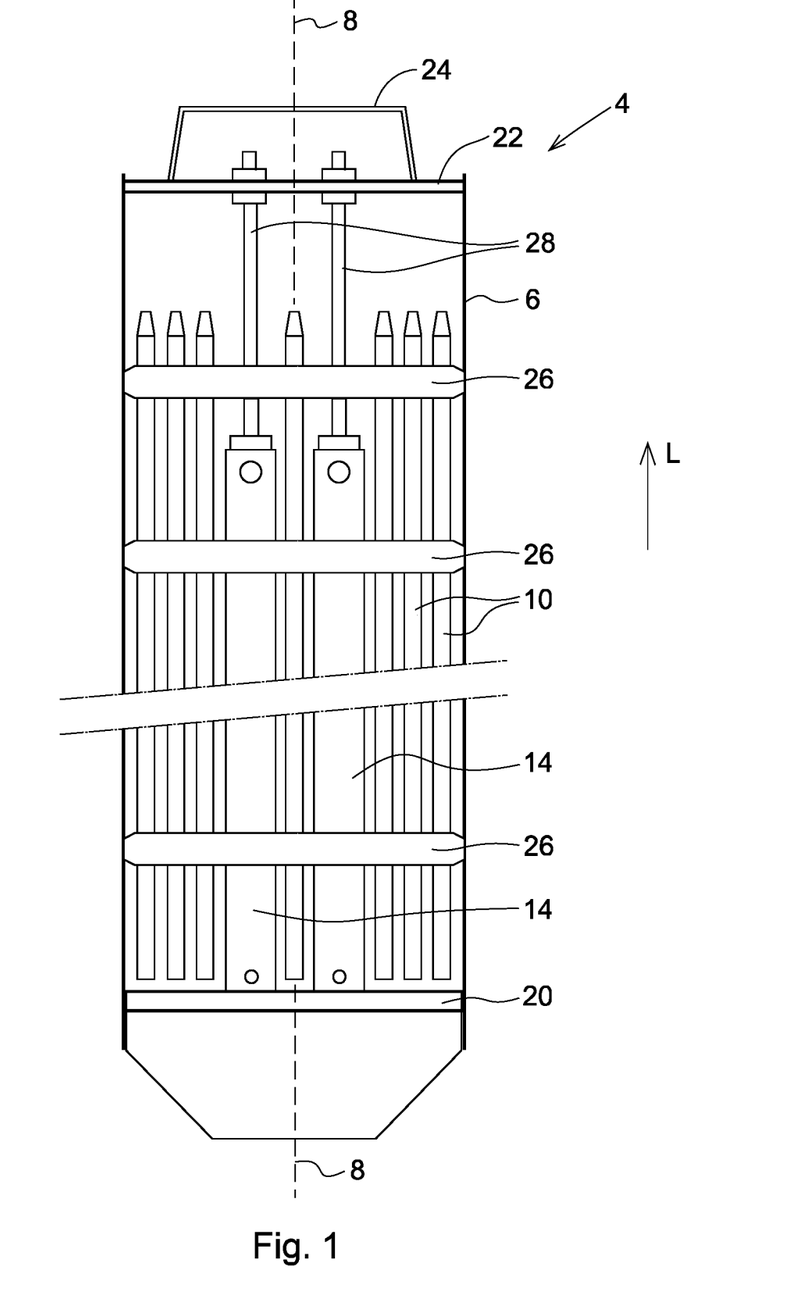
FIG. 1 shows schematically a side view of a fuel assembly according to an embodiment of the invention.

FIG. 1 shows schematically a side view of a fuel assembly 4 according to an embodiment of the invention. The fuel assembly 4 comprises a number of fuel rods 10 and water channels 14. A lower tie plate 20 is arranged below the fuel rods 10. A lower end of the water channels 14 is attached to the tie plate 20. Above the fuel rods 10 an upper lifting device 22 is arranged. The upper lifting device 22 has a handle 24 for gripping and lifting a bundle of fuel rods 10.

The fuel rods 10 are held by a plurality of spacer grids 26. It should be noted that FIG. 1 schematically shows only an upper and lower part of the fuel assembly 4. According to an embodiment, the fuel assembly 4 comprises ten spacer grids 26. The fuel assembly 4 also comprises attachment rods 28, which at a lower end are attached to the upper part of the water channels 14 and which at an upper end are attached to the upper lifting device 22. All spacer grids 26, with one exception, are attached to the water channels 14. The upper spacer grid 26 is positioned at the level of the attachment rods 28. The whole bundle of fuel rods 10 is thus held together with the help of the water channels 14, lower tie plate 20, attachment rods 28, upper lifting device 22 and spacer grids 26. It is therefore possible to lift the whole bundle of fuel rods 10 by gripping and lifting at the handle 24.

Figure 2:
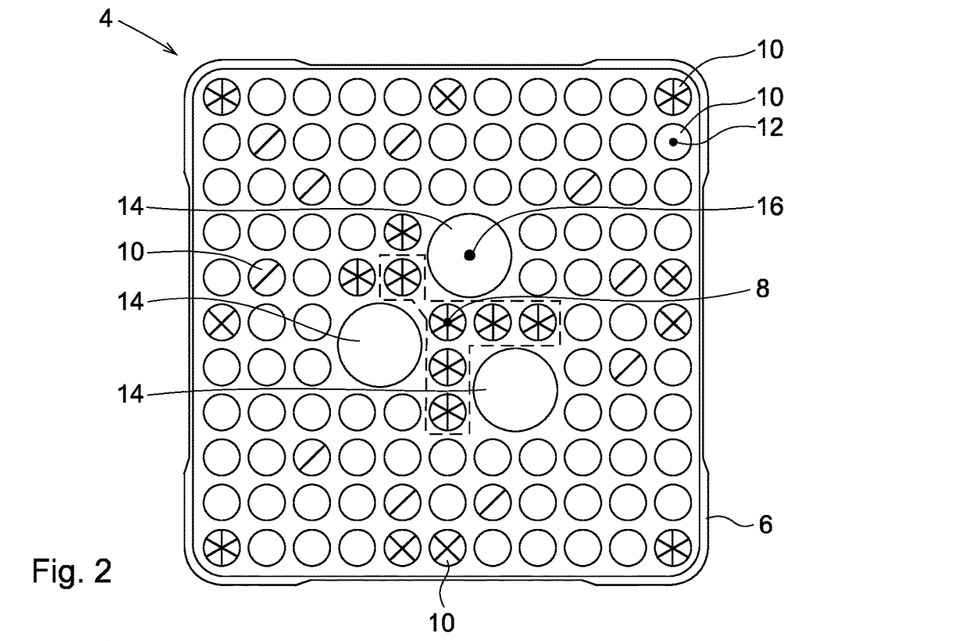
FIG. 2 shows schematically a cross-section of an embodiment of a fuel assembly according to the invention.

With reference also to FIG. 2 the fuel assembly 4 will now be described in more detail. The fuel assembly 4 comprises a fuel channel 6 which surrounds the bundle of fuel rods 10. In FIG. 1 the fuel channel 6 has been removed in the viewing direction in order to make it possible to see the components arranged inside the fuel channel 6. Also, two water channels 14 are shown in FIG. 1, although they in a side view would be partly hidden behind fuel rods 10. The fuel channel 6 extends in a length direction L. The length direction L is normally, when the fuel assembly 4 is in use in a nuclear reactor, the vertical direction. The fuel channel 6 has a central fuel channel axis 8 in said length direction L.

In FIG. 2, all the small circles refer to fuel rods 10. Each fuel rod 10 has a central fuel rod axis 12 (shown only for one fuel rod 10), which extends substantially in the length direction L.

The larger circles in FIG. 2 show the water channels 14. The water channels 14 are configured and positioned for allowing non-boiling water to flow through the water channels 14, when the fuel assembly 4 is in use in a nuclear reactor. Each water channel 14 has a central water channel axis 16 (shown only for one water channel 14 in FIG. 2), which extends substantially in the length direction L.

The fuel assembly comprises a first group of full length fuel rods 10. The full length fuel rods are not marked in FIG. 2 (i.e. they are shown by empty circles). The full length fuel rods 10 extend from a lower part of the fuel assembly 4 to an upper part of the fuel assembly 4, preferably through all the spacer grids 26. It can be noted that in FIG. 1 only full length fuel rods 10 are shown.

The fuel assembly 4 also comprises a second group of fuel rods 10. The second group of fuel rods 10 extend from the lower part of the fuel assembly (like the full length fuel rods) but do not reach as high up as the full length fuel rods.

The fuel rods 10 in said second group can have different lengths. In the shown embodiment, some fuel rods 10 are marked with one stroke. These fuel rods have a length of about $9/10$ of the length of the full length fuel rods. In the shown embodiment, there are ten such fuel rods. When placing these $9/10$ fuel rods, the most reactive positions next to non-boiling water inside the water channels and outside the fuel channel are avoided. This is to minimize the negative impacts of having $1/10$ less uranium in these rods, while serving their purpose of reducing pressure drop near the assembly outlet.

The fuel rods 10 marked with two strokes (a cross) have a length of about $2/3$ of the length of the full length fuel rods. In the shown embodiment there are six such fuel rods. These $2/3$ fuel rods are positioned about halfway between the corner rods in the outer rows and columns of the 11×11 fuel rod array. This is to reduce cold reactivity in the upper part of the fuel bundle which improves the shutdown margin late in the fuel cycle when the power distribution has moved towards the top.

The fuel rods 10 marked with three strokes (a star) have a length of about $1/3$ of the length of the full length fuel rods. In the shown embodiment there are twelve such fuel rods.

As shown in FIG. 2, the fuel assembly 4 according to this embodiment has three water channels 14. Each water channel 14 has a cross-sectional area which is about 5.5 times the cross-sectional area of each one of the fuel rods 10 (or, in case the fuel assembly 4 would have fuel rods 10 of different cross-sectional areas, about 5.5 times the average cross-sectional area of the fuel rods 10).

In the shown embodiment, there are only three water channels 14, i.e. no further water channels.

As shown in FIG. 2, there are eight centrally located fuel rods 10 of the shortest kind, i.e. eight central short fuel rods, which are grouped together and form a set of fuel rods, such that each fuel rod in this set is positioned next to at least one other fuel rod belonging to this set. Of these eight central short fuel rods 10, four are positioned such that for each of these four fuel rods 10 it is the case that the distance between the fuel rod axis 12 and the central fuel channel axis 8 is shorter than the distance between any of the water channel axes 16 of the water channels 14 and the fuel channel axis 8. These four short central fuel rod are thus (with reference to FIG. 2) the central fuel rod positioned on the fuel channel axis 8, the fuel rod positioned just below the central fuel rod, the fuel rod positioned just to the right of the central fuel rod and the fuel rod positioned next to the central fuel rod, one column to the left and one row up.

It should be noted that FIG. 2 shows a schematic cross-section of the fuel assembly 4 in the lower part of the fuel assembly (where also all the shorter fuel rods 10 are present).

There is no longer fuel rod 10 (no $\frac{2}{3}$ fuel rod or $\frac{9}{10}$ fuel rod or full length fuel rod) which is positioned closer to the central fuel channel axis 8 than the central fuel rod axis 12 of any of the four central short fuel rods 10 which fulfill the above definition. Above the four short central fuel rods 10, there is thus an empty space for water in the fuel assembly 4. In fact, there is an empty space for water above all the mentioned eight centrally located short fuel rods 10.

In addition to the eight centrally located short $\frac{1}{3}$ fuel rods, there are a further four such short fuel rods 10 located in the corners of the fuel assembly 4.

Each of the water channels 14 has a circular cross-section, at least in the lower part of the fuel assembly 4 where the shorter central fuel rods 10 are arranged.

In addition to the mentioned four defined central short fuel rods 10, the fuel assembly 4 comprises a further two fuel rods, each of which fulfills the following criterion. The distance between the central fuel rod axis 12 and the central fuel channel axis 8 is less than the distance between the central water channel axis 16 of at least one of the three water channels 14 and the central fuel channel axis 8. In the shown embodiment, there are thus six fuel rods 10 that fulfill the mentioned criterion. These fuel rods 10 are located inside the dashed lines in FIG. 2. Each water channel 14 is positioned next to at least two of the four defined centrally located short fuel rods 10.

As can be seen in FIG. 2, the fuel assembly 4 comprises a substantially regular pattern of fuel rod positions. Each one of the water channels 14 is positioned such that it replaces four fuel rods 10 in this regular pattern.

In the shown embodiment, the fuel assembly 4 thus comprises 81 full length fuel rods 10, ten $\frac{9}{10}$ length fuel rods, six $\frac{2}{3}$ length fuel rods and twelve $\frac{1}{3}$ length fuel rods.

Figure 3:
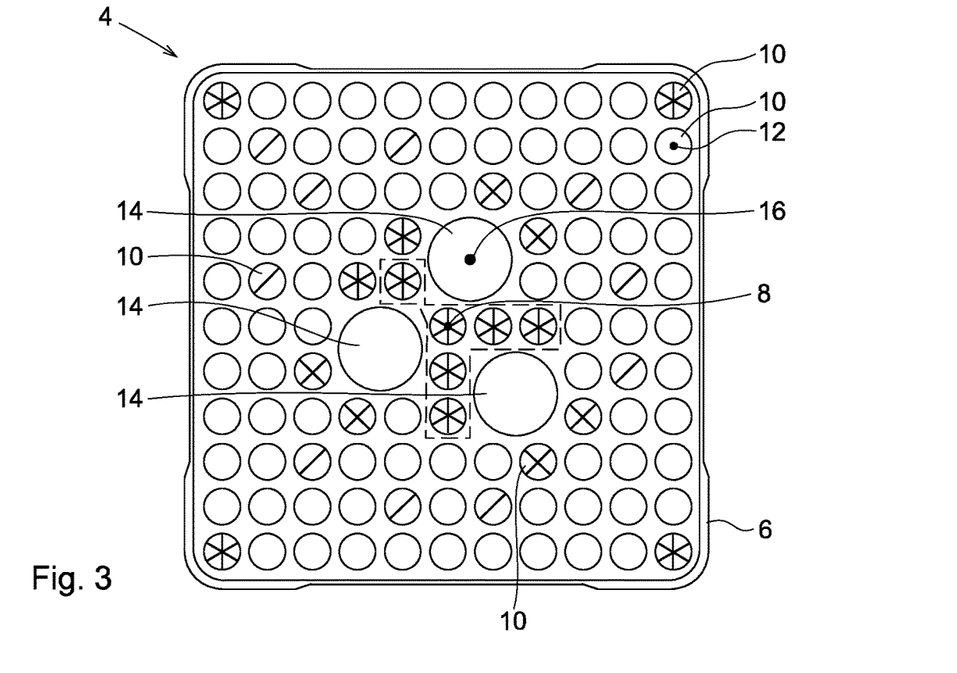
FIG. 3 shows schematically the same cross-section as FIG. 2 of another embodiment of a fuel assembly according to the invention.
Figure 4:
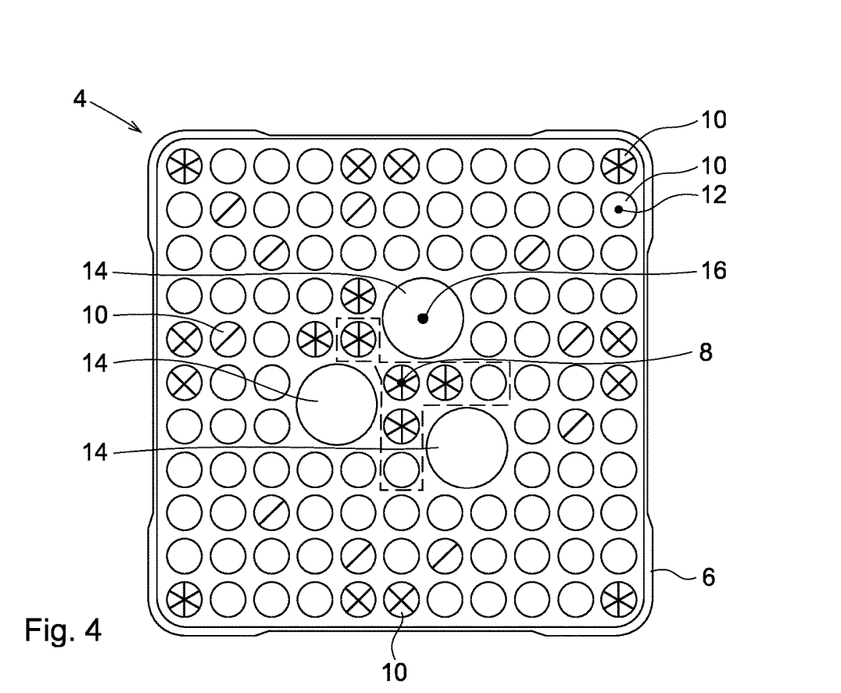
FIG. 4 shows schematically the same cross-section as FIG. 2 of a further embodiment of a fuel assembly according to the invention.
Figure 5:
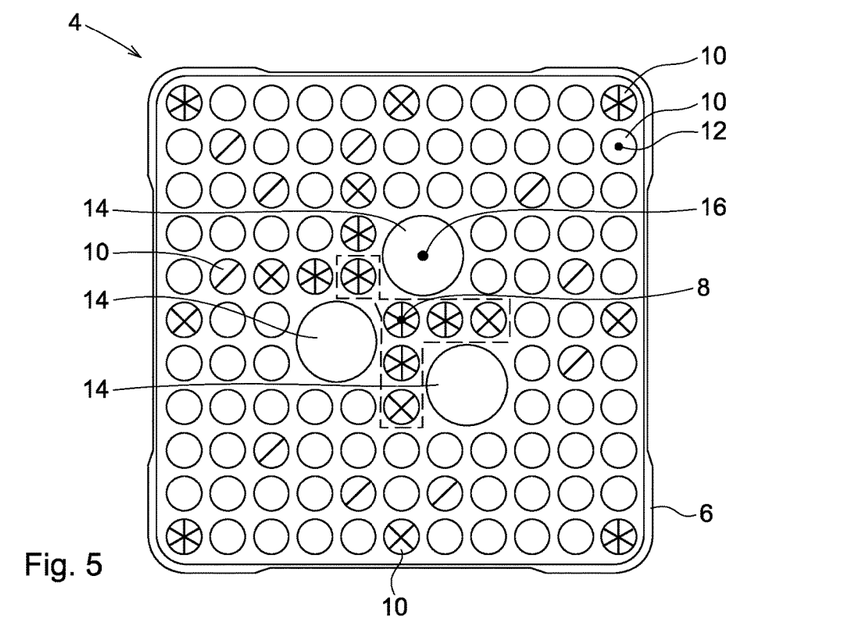
FIG. 5 shows schematically the same cross-section as FIG. 2 of a still further embodiment of a fuel assembly according to the invention.

Further embodiments of the present invention are shown in FIGS. 3, 4 and 5. In these figures, the same markings and the same reference numbers are used as in FIG. 2. It will therefore now only be described how these embodiments differ from the embodiment shown in FIG. 2.

FIG. 3 shows an embodiment which differs from the embodiment in FIG. 2 in that the fuel rods 10 that have a length of about $\frac{2}{3}$ of the length of the full length fuel rods are not positioned next to the periphery of the fuel assembly 4, but instead are positioned further inside the fuel assembly 4. In the embodiment of FIG. 2, the full length fuel rods which are positioned in the outer rows and columns next to the fuel rods of $\frac{2}{3}$ length are highly moderated in the upper region (since there is a large space for water next to these full length fuel rods). This means that the local effect in the higher part of these full length fuel rods is quite high. With the embodiment of FIG. 3, this local high effect is avoided.

FIG. 4 shows an embodiment which differs from the embodiment in FIG. 2 in that two of the centrally located eight $\frac{1}{3}$ short fuel rods 10 have been replaced by full length fuel rods. Furthermore, in the embodiment of FIG. 4 there are eight (instead of six as in FIG. 2) fuel rods of the length $\frac{2}{3}$ arranged in the outer rows and columns. Since there are only six central short $\frac{1}{3}$ fuel rods in the embodiment of FIG. 4, the flow velocity in the central upper region is reduced. Furthermore, with the arrangement of FIG. 4, there is a more even distribution of the nuclear fuel in the upper part of the fuel assembly as compared to the embodiment of FIG. 2.

FIG. 5 shows an embodiment which differs from the embodiment in FIG. 2 in that two of the centrally located eight $\frac{1}{3}$ short fuel rods 10 have been replaced by $\frac{2}{3}$ length fuel rods. Furthermore, in the embodiment of FIG. 5 there are only four $\frac{2}{3}$ length fuel rods which are positioned in the outer rows and columns. Instead, there are two $\frac{2}{3}$ length fuel rods which are positioned next to the centrally located $\frac{1}{3}$ length fuel rods (one $\frac{2}{3}$ length fuel rod positioned in the third row from above and the fifth column from the left and one $\frac{2}{3}$ length fuel rod positioned in the fifth row from above and the third column from the left). In the embodiment of FIG. 5, there are thus six centrally located $\frac{1}{3}$ length fuel rods and also four $\frac{2}{3}$ length fuel rods, i.e. together 10 fuel rods shorter than 0.80 of the length of the full length fuel rods, which are grouped together such that they form a set such that each fuel rod in the set is positioned next to at least one other fuel rod belonging to the set. This embodiment has appeared to bring about a good compromise of the advantages described in connection with the previous embodiments.

The shown embodiments provide advantageous fuel assemblies with which the above described objects and advantages of the invention are achieved.

Many variations of the illustrated embodiments are possible within the scope of the present invention. For example, the number of fuel rods may vary and the number of fuel rods of the different lengths may vary. For example, there may be fewer, or more, or no at all, fuel rods which have the length $\frac{9}{10}$.

The present invention is thus not limited to the examples described herein, but can be varied and modified within the scope of the following claims.

What is claimed is:

1. A fuel assembly for a nuclear power boiling water reactor, comprising:
    a fuel channel extending in and defining a length direction of the fuel assembly and defining a central fuel channel axis extending in said length direction,
    fuel rods positioned such that they are surrounded by said fuel channel, each fuel rod having a central fuel rod axis extending substantially in said length direction,
    water channels positioned such that they are surrounded by said fuel channel, the water channels being configured and positioned for, during operation, allowing non-boiling water to flow through the water channels, each water channel having a central water channel axis extending substantially in said length direction,
    wherein said fuel rods comprise a first group of fuel rods and a second group of fuel rods, wherein each fuel rod in said first group is a full length fuel rod that extends from a lower part of the fuel assembly to an upper part of the fuel assembly, wherein each fuel rod in said second group is a part length fuel rod that extends from said lower part of the fuel assembly and upwards, but does not reach as high up as said full length fuel rods, wherein the fuel assembly comprises 3 water channels, each of which has a cross-sectional area that is at least twice as large as the average cross-sectional area of the fuel rods, wherein the water channels are positioned with no further water channel having its central axis closer to the central fuel channel axis than the central water channel axis of each of the 3 water channels, wherein the fuel assembly comprises 3 or 4, but not more than 4, second group fuel rods positioned with their central fuel rod axes being closer to the central fuel channel axis than any of the water channel axes of the water channels, and wherein the fuel assembly comprises no more than 3 water channels.

2. A fuel assembly according to claim 1, wherein no full length fuel rod is positioned with its central fuel rod axis closer to the central fuel channel axis than the central fuel rod axis of any of said 3 or 4 second group fuel rods.

3. A fuel assembly according to claim 1, comprising 4 second group fuel rods positioned with their respective central fuel rod axes closer to the central fuel channel axis than any of the water channel axes of the water channels.

4. A fuel assembly according to claim 1, comprising a set of 6-12 second group fuel rods, wherein said set includes said 3 or 4 second group fuel rods positioned closer to the central fuel channel axis than any of the water channel axes of the water channels, wherein each fuel rod in said set has a length which is less than 0.80 times the length of said full length fuel rods, and wherein the fuel rods in said set are grouped together such that each fuel rod in said set is positioned next to at least one other fuel rod belonging to said set.

5. A fuel assembly according to claim 1, wherein each of said 3 or 4 second group fuel rods positioned closer to the central fuel channel axis than any of the water channel axes of the water channels has a length that is less than 0.50 times the length of said full length fuel rods.

6. A fuel assembly according to claim 5, wherein no fuel rod longer than 0.50 times the length of said full length fuel rods is positioned with its central fuel rod axis closer to the central fuel channel axis than the central fuel rod axis of any of said 3 or 4 second group fuel rods positioned closer to the central fuel channel axis than any of the water channel axes of the water channels.

7. A fuel assembly according to claim 1, wherein each one of said at least 3 water channels has a cross-sectional area which is between 3.0 and 10.0, times the average cross-sectional area of the fuel rods.

8. A fuel assembly according to claim 1, wherein each of said water channels has a circular cross-section, at least in the lower part of the fuel assembly where the second group fuel rods are arranged.

9. A fuel assembly according to claim 1, wherein the fuel assembly comprises no more than 12 fuel rods having a distance between the central fuel rod axis and the central fuel channel axis less than the distance between the central water channel axis of at least one of said water channels and the central fuel channel axis.

10. A fuel assembly according to claim 1, wherein the fuel assembly comprises a substantially regular pattern of fuel rod positions, wherein each one of said water channels is positioned such that it replaces 4 fuel rods in this substantially regular pattern.

11. A fuel assembly according to claim 1, wherein the fuel assembly comprises 65-160 fuel rods.

12. A fuel assembly according to claim 1, wherein the fuel assembly further comprises 2-10 additional second group fuel rods, each of which has a length of between 0.59 and 0.79 times the length of said full length fuel rods.

13. A fuel assembly according to claim 1, wherein the fuel assembly comprises at least 70 full length fuel rods.

14. A fuel assembly according to claim 1, further comprising:

a lower tie plate, positioned below the fuel rods, wherein a lower end of each of said at least 3 water channels is attached to said tie plate, an upper lifting device positioned above the fuel rods and including a handle for gripping and lifting a bundle of fuel rods, a plurality of spacer grids for holding the fuel rods, at least most of the spacer grids being attached to said at least 3 water channels, and attachment rods attached at their lower ends to the upper part of said water channels and at their upper ends to said upper lifting device.

* * * * *